(12) United States Patent
Cai et al.

(10) Patent No.: US 11,180,577 B2
(45) Date of Patent: Nov. 23, 2021

(54) RATING POLYMERIZATION PROCESSES

(71) Applicant: Univation Technologies, LLC, Houston, TX (US)

(72) Inventors: Ping Cai, Lake Jackson, TX (US); Francois Alexandre, Saint-Leonard (CA); Mark G. Goode, S. Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 30 days.

(21) Appl. No.: 16/469,867

(22) PCT Filed: Dec. 6, 2017

(86) PCT No.: PCT/US2017/064806
§ 371 (c)(1),
(2) Date: Jun. 14, 2019

(87) PCT Pub. No.: WO2018/111631
PCT Pub. Date: Jun. 21, 2018

(65) Prior Publication Data
US 2020/0079882 A1    Mar. 12, 2020

Related U.S. Application Data

(60) Provisional application No. 62/434,465, filed on Dec. 15, 2016.

(51) Int. Cl.
*C08F 2/01* (2006.01)
*C08F 2/34* (2006.01)
*C08F 4/24* (2006.01)
*C08F 210/02* (2006.01)

(52) U.S. Cl.
CPC .................. *C08F 2/01* (2013.01); *C08F 2/34* (2013.01); *C08F 4/24* (2013.01); *C08F 210/02* (2013.01)

(58) Field of Classification Search
None
See application file for complete search history.

(56) References Cited

U.S. PATENT DOCUMENTS

| | | | |
|---|---|---|---|
| 7,569,175 | B1 | 8/2009 | Nilsen et al. |
| 7,585,923 | B2 | 9/2009 | Sandell et al. |
| 7,601,783 | B2 | 10/2009 | Davis et al. |
| 7,838,605 | B2 | 11/2010 | Sandell et al. |
| 8,058,336 | B2 | 11/2011 | Robinson |
| 8,138,264 | B2 | 3/2012 | Coffy et al. |

(Continued)

FOREIGN PATENT DOCUMENTS

| | | |
|---|---|---|
| EP | 1172381 | 1/2002 |
| WO | 01/14122 | 3/2001 |
| WO | 2008002379 | 1/2008 |

OTHER PUBLICATIONS

International Preliminary Report on Patentability for related PCT Application PCT/US2017/064806, dated Jun. 27, 2019 (8 pgs).

(Continued)

*Primary Examiner* — Fred M Teskin
(74) *Attorney, Agent, or Firm* — Brooks, Cameron & Huebsch, PLLC (57) ABSTRACT

Embodiments of the present disclosure are directed towards methods for rating polymerization processes based upon a first cracking index value and a second cracking index value.

8 Claims, 1 Drawing Sheet

(56) References Cited

U.S. PATENT DOCUMENTS

| | | |
|---|---|---|
| 9,475,898 B2 | 10/2016 | Rohatgi et al. |
| 9,932,426 B2 | 4/2018 | Rix et al. |
| 10,227,428 B2 | 3/2019 | Goode et al. |
| 2005/0085598 A1 | 4/2005 | Sandell et al. |
| 2008/0126383 A1* | 5/2008 | Perrin .................... E21B 41/02 |
| 2015/0259444 A1 | 9/2015 | Rohatgi et al. |

OTHER PUBLICATIONS

International Search Report & Written Opinion for related PCT Application PCT/US2017/064806, dated Mar. 7, 2018 (12 pgs).

* cited by examiner

RATING POLYMERIZATION PROCESSES

This application is a National Stage Application under 35 U.S.C. § 371 of International Application Number PCT/US2017/064806, filed Dec. 6, 2017 and published as WO 2018/111631 on Jun. 21, 2018, which claims the benefit to U.S. Provisional Application 62/434,465, filed Dec. 15, 2016, the entire contents of which are incorporated herein by reference in its entirety.

FIELD OF DISCLOSURE

Embodiments of the present disclosure are directed methods for rating a polymerization process, more specifically, embodiments are directed towards methods for rating polymerization processes based upon a first cracking index value and a second cracking index value.

BACKGROUND

Polymers may be utilized for a number of products including films and pipes, among others. Polymers can be formed by reacting one or more types of monomer in a polymerization reaction. There is continued focus in the industry on developing new and improved materials and/or methods that may be utilized to form polymers having one or more desirable properties.

SUMMARY

The present disclosure provides methods for rating a polymerization processes including: determining a first cracking index value for a first polymerization process; changing a parameter of the first polymerization process to provide a second polymerization process; determining a second cracking index value for the second polymerization process; and rating the first polymerization process and the second polymerization process based upon the first cracking index value and the second cracking index value.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1:
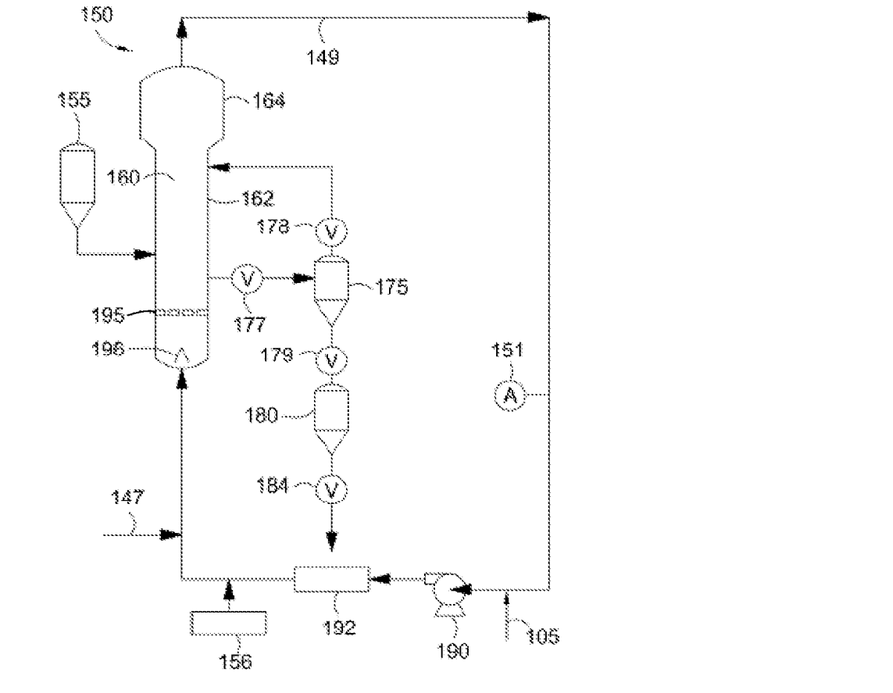
The FIGURE illustrates an example of a portion of a polymerization system in accordance with one or more embodiments of the present disclosure.

Methods for rating polymerization processes are described herein. Advantageously, it has been found that a cracking index value may be determined via catalyst productivity and particle-size-distribution data. This may be advantageous, as no additional testing is utilized to quantitatively measure the polymer-particle cracking, for example. Further advantageously, the cracking index value may be utilized to rate a number of polymerization processes. For instance, a first polymerization process may be performed and a cracking index value for the first polymerization process may be determined. Thereafter, a second polymerization process, having a process parameter changed relative to the first polymerization process, may be performed and a cracking index value for the second polymerization process may be determined. The first polymerization process and the second polymerization process may then be rated based upon the first cracking index value and the second cracking index value. The rating of polymerization processes can help determine what polymerization process may be more desirable for a particular application. For instance, for a number of applications, one or more embodiments of the present disclosure provides that a greater relative cracking index value can correspond to a higher relative rating. For example, a greater relative cracking index value can indicate that the polymerization processes associated with the greater relative cracking index value may provide a product, e.g., a film, having a reduced total defect area (TDA), compared to another film formed from another polymerization processes and having a relatively lesser cracking index value. As such, the polymerization process having the greater relative cracking index value can have a higher relative rating, as compared to the relatively lower rating associated with the polymerization process having the lesser relative cracking index value.

As used herein a "polymer" has two or more of the same or different polymer units derived from one or more different monomers, e.g., homopolymers, copolymers, terpolymers, etc. A "homopolymer" is a polymer having polymer units that are the same. A "copolymer" is a polymer having two or more polymer units that are different from each other. A "terpolymer" is a polymer having three polymer units that are different from each other. "Different" in reference to polymer units indicates that the polymer units differ from each other by at least one atom or are different isomerically. Accordingly, the definition of copolymer, as used herein, includes terpolymers and the like. As used herein a "polymerization process" is a process that is utilized to form a polymer.

Embodiments of the present disclosure provide that the polymer can be a polyolefin. As used herein an "olefin," which may be referred to as an "alkene," refers to a linear, branched, or cyclic compound including carbon and hydrogen and having at least one double bond. As used herein, when a polymer or copolymer is referred to as comprising, e.g., being formed from, an olefin, the olefin present in such polymer or copolymer is the polymerized form of the olefin. For example, when a copolymer is said to have an ethylene content of 75 wt % to 85 wt %, it is understood that the polymer unit in the copolymer is derived from ethylene in the polymerization reaction and the derived units are present at 75 wt % to 85 wt %, based upon the total weight of the polymer. A higher α-olefin refers to an α-olefin having 3 or more carbon atoms.

Polyolefins include polymers made from olefin monomers such as ethylene, i.e., polyethylene, and linear or branched higher alpha-olefin monomers containing 3 to about 20 carbon atoms. Examples of higher alpha-olefin monomers include, but are not limited to, propylene, 1-butene, 1-pentene, 1-hexene, 4-methyl-1-pentene, 1-octene, and 3,5,5-trimethyl-1-hexene. Examples of polyolefins include ethylene-based polymers, having at least 50 wt % ethylene, including ethylene-1-butene, ethylene-1-hexene, and ethylene-1-octene copolymers, among others. Other olefins that may be utilized include ethylenically unsaturated monomers, diolefins having 4 to 18 carbon atoms, conjugated or nonconjugated dienes, polyenes, vinyl monomers and cyclic olefins, for example. Examples of the monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In a number of embodiments, a copolymer of ethylene can be produced, where with ethylene, a comonomer having at least one alpha-olefin having from 4 to 15 carbon atoms, preferably from 4 to 12 carbon atoms, and most preferably from 4 to 8 carbon atoms, is polymerized, e.g., in a gas phase polymerization process. In another embodiment, ethylene and/or propylene can be polymerized with at least two different comonomers, optionally one of which may be a diene, to form a terpolymer.

Embodiments of the present disclosure provide that the polymers can have a density of from 0.920 to 0.970 g/cm$^3$. For example, the polymers can have a density of ≥0.920 g/cm$^3$, ≥0.930 g/cc, ≥0.935 g/cm$^3$, ≥0.940 g/cm$^3$, or ≥0.945 g/cm$^3$, and ≤0.970 g/cm, ≤0.960 g/cm$^3$, ≤0.950 g/cm, ≤0.935 g/cm$^3$, ≤0.930 g/cm$^3$, or ≤0.925 g/cm$^3$, or any combination of any high or low value recited herein. For instance, the polymers can have a density of 0.925 to 0.950 g/cm$^3$, 0.930 to 0.940 g/cm$^3$, 0.935 to 0.945 g/cm$^3$, and 0.935 to 0.950 g/cm$^3$, among others.

Generally, a relatively greater co-monomer content can result in a relatively lower density. Polyethylene copolymers herein can have a co-monomer content of ≥0 to 15 wt % based on a total weight of the polyethylene copolymer, e.g., 1.0 to 12.0 wt %, 2.0 to 10.0 wt %, 2.0 to 8.0 wt %, 2.0 to 7.0 wt %, 2.0 to 6.0 wt %, for example, where the polyethylene copolymers comprise co-monomer units derived from 1-butene and/or 1-hexene.

Embodiments of the present disclosure provide that the polymers can have a weight-averaged molecular weight (Mw) ≥about 100,000 g/mol, ≥about 150,000 g/mol≥about 200,000 g/mol, ≥about 300,000 g/mol, ≥about 400,000 g/mol, ≥about 500,000 g/mol, ≥about 750,000 g/mol, or ≥about 1,000,000 g/mol. Additionally or alternatively, the Mw may be ≤about 1,000,000 g/mol, ≤about 750,000 g/mol, ≤about 1,000,000 g/mol, ≤about 500,000 g/mol, ≤about 400,000 g/mol, ≤about 300,000 g/mol, ≤about 200,000 g/mol, or ≤about 150,000 g/mol, or combinations of high or low values that provide ranges, as recited herein.

Embodiments of the present disclosure provide that the polymers can have a polymer flow index, e.g., a modified polymer flow index, of ≥about 0.01 g/10 min, ≥about 0.02 g/10 min, ≥about 0.10 g/10 min, ≥about 0.50 g/10 min, ≥about 0.75 g/10 min, ≥about 1.0 g/10 min, ≥about 2.0 g/10 min, ≥about 5.0 g/10 min, ≥about 10.0 g/10 min., or ≥about 25.0 g/10 min. Additionally or alternatively, the polymer flow index may be ≤about 50.0 g/10 min, e.g., ≤about 25.0 g/10 min, ≤about 10.0 g/10 min, ≤about 5.0 g/10 min, ≤about 2.0 g/10 min, ≤about 1.0 g/10 min, or ≤about 0.50 g/10 min. The polymer flow index may be in a range that includes a combination of any high and low values disclosed herein. For example, the polymers can have a polymer flow index in a range of about 0.01 to about 50.0 g/10 min, about 0.01 to about 25.0 g/10 min, about 0.01 to about 10.0 g/10 min, about 0.01 to about 5.0 g/10 min, about 0.01 to about 2.0 g/10 min, among others.

A number of embodiments of the present disclosure provide that one or more catalysts may be utilized in a polymerization process. The catalyst, which includes and may be referred to as a catalyst composition, may be a chromium catalyst. As used herein "chromium catalyst" refers to a catalyst that includes chromium. Examples of catalysts include those commercially available under the tradenames UCAT™ and ACCLAIM™, both available from The Dow Chemical Company, among others. The catalyst may include a reducing agent. For a number of embodiments of the present disclosure, the chromium catalyst is a chromium oxide catalyst reduced with metal alkyl. In other words, a reduced chromium oxide catalyst may be utilized to form the polymer having the modified polymer flow index, as described herein. For initialization of the polymerization, e.g., for a pilot plant polymerization, a silyl chromate catalyst reduced with metal alkyl may be employed before transitioning to the reduced chromium oxide catalyst. The silyl chromate catalyst may be referred to as a startup catalyst. Alternatively, the reduced chromium oxide catalyst may be used to initiate polymerization with similar performance as the silyl chromate catalyst.

Chromium compounds may be used to prepare chromium oxide catalysts. Chromium compounds include $CrO_3$, as well as other compounds that are convertible to $CrO_3$, e.g., under high temperature activation conditions in the presence of oxygen. Examples of compounds that are convertible to $CrO_3$ include chromic acetyl acetonate, chromic halide, chromic nitrate, chromic acetate, chromic sulfate, ammonium chromate, ammonium dichromate, or other soluble, chromium containing salts. Other examples of compounds that are convertible to $CrO_3$ include those discussed in U.S. Pat. Nos. 2,825,721, 3,023,203, 3,622,251, and 4,011,382, for instance. In a number of embodiments, chromic acetate may be utilized.

Silyl chromate compounds may be used to prepare the silyl chromate catalysts. Silyl chromate compounds include bis-triethylsilyl chromate, bis-tributylsilyl chromate, bis-triisopentylsilyl chromate, bis-tri-2-ethylhexylsilyl chromate, bis-tridecylsilyl chromate, bis-tri(tetradecyl)silyl chromate, bis-tribenzylsilyl chromate, bis-triphenylethylsilyl chromate, bis-triphenylsilyl chromate, bis-tritolylsilyl chromate, bis-trixylylsilyl chromate, bis-trinaphthylsilyl chromate, bis-triethylphenylsilyl chromate, bis-trimethylnaphthylsilyl chromate, polydiphenylsilyl chromate, and polydiethylsilyl chromate. Examples of such catalysts are discussed, for example, in U.S. Pat. Nos. 3,324,101, 3,704, 287, and 4,100,105, among others. In some embodiments, bis-triphenylsilyl chromate, bis-tritolylsilyl chromate, bis-trixylylsilyl chromate, and bis-trinaphthylsilyl chromate may be utilized. In other embodiments, bis-triphenylsilyl chromate may be utilized.

The silyl chromate compounds may be deposited onto conventional catalyst supports or bases, for example, inorganic oxide materials. The chromium compound used to produce a chromium oxide catalyst may be deposited onto conventional catalyst supports. The term "support," as used herein, refers to any support material, a porous support material in one exemplary embodiment, including inorganic or organic support materials. The supports may be inorganic oxides that include Group 2, 3, 4, 5, 13 and 14 oxides, and more particularly, inorganic oxides of Group 13 and 14 atoms. The Group element notation in this specification is as defined in the Periodic Table of Elements according to the IUPAC 1988 notation (IUPAC Nomenclature of Inorganic Chemistry 1960, Blackwell Publ., London). Therein, Groups 4, 5, 8, 9 and 15 correspond respectively to Groups IVB, VB, IIIA, IVA and VA of the Deming notation (Chemical Rubber Company's Handbook of Chemistry & Physics, 48th edition) and to Groups IVA, VA, IIIB, IVB and VB of the IUPAC 1970 notation (Kirk-Othmer Encyclopedia of Chemical Technology, 2nd edition, Vol. 8, p. 94). Non-limiting examples of supports include inorganic oxides such as silica, alumina, titania, zirconia, thoria, as well as mixtures of such oxides such as, for example, silica-chromium, silica-alumina, silica-titania, and the like.

Inorganic oxide materials, which may be used as a support in the catalyst compositions of the present disclosure, are porous materials having variable surface area and particle size. The support may have a surface area in a range of 50 to 1000 square meters per gram, and an average particle size of 20 to 300 micrometers. In one or more embodiments, the support may have a pore volume of about 0.5 to about 6.0 cm$^3$/g and a surface area of about 200 to about 600 m$^2$/g. In one or more embodiments, the support may have a pore volume of about 1.1 to about 1.8 cm$^3$/g and a surface area of about 245 to about 375 m$^2$/g. In one or more embodiments, the support may have a pore volume of about 2.4 to about 3.7 cm$^3$/g and a surface area of about 410 to about 620 m$^2$/g. In one or more embodiments, the support may have a pore volume of about 0.9 to about 1.4 cm$^3$/g and a surface area of about 390 to about 590 m$^2$/g. Each of the above properties may be measured using conventional techniques as known in the art.

The support may comprise silica, including amorphous silica, and high surface area amorphous silica. Such support materials are commercially available from a number of sources. Such sources include the W.R. Grace and Company which markets silica support materials under the trade names of Sylopol 952 or Sylopol 955, and PQ Corporation, which markets silica support materials under various trade designations, including ES70. The silica can be in the form of spherical particles, which are obtained by a spray-drying process, for example. Alternatively, PQ Corporation markets silica support materials under trade names such as MS3050 which are not spray-dried. As procured, these silicas are not calcined, i.e., not dehydrated. However, silica that is calcined prior to purchase may be used in catalysts of the present disclosure.

Supported chromium compounds, such as chromium acetate, which are commercially available, may also be used as a catalyst. Commercial sources include the W.R. Grace and Company, which provides chromium on silica support materials under trade names such as Sylopol 957, Sylopol 957HS, or Sylopol 957BG, and PQ Corporation, which provides chromium on silica support materials under various trade names, such as ES370. The chromium on silica support can be in the form of spherical particles, which are obtained by a spray-drying process. Alternatively, PQ Corporation provides chromium on silica support materials under trade names such as C35100MS and C35300MS, which are not spray-dried. As procured, these silicas are not activated. However, if available, chromium supported on silica that is activated prior to purchase may be used in catalysts of the present disclosure.

Activation of a supported chromium oxide catalyst can be accomplished at various temperatures, e.g., from about 300° C. up to a temperature at which substantial sintering of the support takes place. For example, activated catalysts may be prepared in a fluidized-bed, as follows. The passage of a stream of dry air or oxygen through a supported chromium-based catalyst during the activation aids in the displacement of any water from the support and converts, at least partially, chromium species to Cr+6.

Temperatures used to activate the chromium oxide-based catalysts can be high enough for rearrangement of the chromium compound on the support material. Peak activation temperatures of from about 300° C. to about 900° C. for periods of from greater than 1 hour to as high as 48 hours can be utilized. The supported chromium oxide catalysts may be activated at temperatures from about 400° C. to about 850° C., from about 500° C. to about 700° C., or from about 550° C. to about 650° C. For one or more embodiments, the activation temperatures are about 600° C., about 700° C., or about 800° C. The supported chromium oxide catalysts may be activated at a chosen peak activation temperature for a period of from about 1 to about 36 hours, from about 3 to about 24 hours, or from about 4 to about 6 hours. For one or more embodiments, peak activation times are about 4 hours, or about 6 hours. Activation can be performed in an oxidative environment; for example, well dried air or oxygen can be used and the temperature can be maintained below the temperature at which substantial sintering of the support occurs. After the chromium compounds are activated, a powdery, free-flowing particulate chromium oxide catalyst is produced.

The cooled, activated chromium oxide catalyst may then be slurried and contacted with a reducing agent, fed at a selected feed rate over a selected time period, to result in a catalyst composition having a polymer flow index response within a selected range. The solvent may then be substantially removed from the slurry to result in a dried, free-flowing catalyst powder, which may be fed to a polymerization system as is or slurried in a suitable liquid prior to feeding.

In one or more embodiments, because organometallic components utilized in preparation of the catalysts described herein may react with water, the support material should preferably be substantially dry. For example, where the chromium-based catalysts are silyl chromates, the untreated supports may be dehydrated or calcined prior to contacting with the chromium-based catalysts.

The support may be calcined at elevated temperatures to remove water, and/or to effectuate a chemical change on the surface of the support. Calcination of the support can be performed using a procedure known to those of ordinary skill in the art.

For example, calcined silica may be prepared in a fluidized-bed, as follows. A silica support material, e.g. Sylopol 955, may be heated in steps or steadily from ambient temperature to the desired calcining temperature. e.g., 600° C., while passing dry nitrogen or dry air through or over the support material. The silica can be maintained at about this temperature for about 1 to about 4 hours, after which it is allowed to cool to ambient temperature. The calcination temperature may affect the number of OH groups on the support surface; i.e., the number of OH groups on the support surface (silanol groups in the case of silica) is approximately inversely proportional to the temperature of drying or dehydration: the higher the temperature, the lower the hydroxyl group content.

Supports may be calcined at a peak temperature from about 350° C. to about 850° C., from about 400° C. to about 700° C., or from about 500° C. to about 650° C. Calcination times may be from about 2 hours to about 24 hours, from about 4 hours to about 16 hours, from about 8 hours to about 12 hours.

The silyl chromate compound may be contacted with the calcined support to form a "bound catalyst." The silyl chromate compound may be contacted with the calcined support material in a procedure known to one of ordinary skill in the art. The silyl chromate compound may be contacted with the support as in a solution, slurry, or solid form, or some combination thereof, and may be heated to any desirable temperature, for a specified time sufficient to effectuate a desirable chemical/physical transformation.

This contacting and transformation can be conducted in a non-polar solvent. Suitable non-polar solvents may be materials which are liquid at contacting and transformation temperatures and in which some of the components used during the catalyst preparation, i.e., silyl chromate compounds and reducing agents are at least partially soluble. The non-polar solvents may be alkanes, particularly those containing about 5 to about 10 carbon atoms, such as pentane, isopentane, hexane, isohexane, n-heptane, isoheptane, octane, nonane, and decane. They may be cycloalkanes, particularly those containing about 5 to about 10 carbon atoms, such as cyclohexane and methylcyclohexane, may also be used. The non-polar solvent may also be a solvent mixture. The non-polar solvent may be purified prior to use, such as by degassing under vacuum and/or heat or by percolation through silica gel and/or molecular sieves, to remove traces of water, molecular oxygen, polar compounds, and other materials capable of adversely affecting catalyst activity. A reducing agent may then be contacted with the slurry, where the reducing agent is fed at a selected feed rate over a selected time period to result in a catalyst having a flow index response within a selected range. Alternatively, after supporting the silyl chromate compound on the support, and before adding the reducing agent, the solvent may then be substantially removed by evaporation, to yield a free-flowing supported silyl chromate on support. The thus supported silyl chromate may be re-slurried in the same or a different non-polar solvent and contacted with a reducing agent to result in a selected flow index response.

Once the catalyst is supported, and in the case of chromium oxide catalysts, activated, the chromium-based catalyst composition may then be slurried in a non-polar solvent, prior to the addition of the reducing agent. The supported catalyst may be chromium oxide supported catalysts, silyl chromate catalysts, or a mixture of both. This slurry is prepared by admixture of the supported catalyst with the non-polar solvent. In some embodiments, the supported silyl chromate compound is not dried before the addition of the reducing agent.

The chromium-based catalysts of the present disclosure can be contacted with a reducing agent. Reducing agents include organoaluminum compounds such as aluminum alkyls and alkyl aluminum alkoxides, for instance. Alkyl aluminum alkoxides, of the general formula $R_2AlOR$, may be suitable for use in embodiments of this disclosure. The R or alkyl groups of the above general formula may be the same or different, may have from about 1 to about 12 carbon atoms in some embodiments, about 1 to about 10 carbon atoms in other embodiments, about 2 to about 8 carbon atoms in yet other embodiments, and about 2 to about 4 carbon atoms in further embodiments. Examples of the alkyl aluminum alkoxides include, but are not limited to, diethylaluminum methoxide, diethylaluminum ethoxide (DEAlE), diethylaluminum propoxide, diethylaluminum iso-propoxide, diethylaluminum tert-butoxide, dimethylaluminum ethoxide, di-isopropyl aluminum ethoxide, di-isobutyl aluminum ethoxide, methyl ethyl aluminum ethoxide and mixtures thereof.

The reducing agent may be added to a mixture of a supported chromate catalyst with a non-polar solvent. The reducing agent may be added to a mixture of an activated chromium oxide catalyst with a non-polar solvent that comprises an agitated slurry, for instance. The reducing agent may be added to a mixture of silyl chromate catalysts and activated chromium oxide-based catalyst in a non-polar solvent that comprises an agitated slurry. The slurry may occupy about 50% to 100%, 75% to 95%, or 80% to 90% of the slurry vessel volume. When both chromium oxide-based catalysts and silyl chromate-based catalysts are utilized, each catalyst may be deposited on a separate support and have respective calcination and/or activation treatments prior to mixing together. Addition of the reducing agent to the catalyst slurry may be conducted at elevated temperatures and under an inert atmosphere, such as up to 7 bar (100 psig) nitrogen head pressure. For example, the slurry may be maintained at a temperature between about 30° C. and 80° C. during admixture of the reducing agent, at a temperature between about 40° C. and about 60° C., or at a temperature between about 40° C. and about 50° C. The slurry, after reduction, may be dried by heating a jacket on the slurry vessel from about 40° C. to 90° C., 50° C. to 80° C., or 60° C. to 70° C.

Chromium-based catalysts formed by the described processes may have a chromium loading, e.g., chromium on the support, ranging from about 0.15 to about 3 weight percent based on the total weight of the catalyst; from about 0.2 to about 0.3 weight percent; from about 0.4 to about 0.6 weight percent; or from 0.7 to about 1.2 weight percent. Chromium-based catalysts formed by the described processes may have a reducing agent to chromium molar ratio ranging from about 0.5 to about 8 in some embodiments; from about 2 to about 7 in other embodiments; and from about 3.0 to about 5.5 in yet other embodiments.

A number of embodiments of the present disclosure provide that chromium-based catalysts formed by the described processes may have an aluminum loading, e.g., aluminum on the support, ranging from about 0.15 to about 3 weight percent based on the total weight of the catalyst; from about 0.2 to about 0.3 weight percent; from about 0.4 to about 0.6 weight percent; or from 0.7 to about 2.0 weight percent. Chromium-based catalysts formed by the described processes may have a reducing agent to aluminum molar ratio ranging from about 0.5 to about 8 in some embodiments; from about 1 to about 7 in other embodiments; and from about 2.0 to about 5.5 in yet other embodiments.

The polymers may be formed by suspension, slurry, and/or gas phase polymerization processes, using known equipment and reaction conditions. Polymer formation is not limited to any specific type of polymerization system. As an example, polymerization temperatures may range from about 0° C. to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40° C. to about 300° C.

A number of embodiments of the present disclosure provide that the polymers may be formed via a gas phase polymerization system, at super-atmospheric pressures in the range from 0.07 to 68.9 bar (1 to 1000 psig), from 3.45 to 27.6 bar (50 to 400 psig), or from 6.89 to 24.1 bar (100 to 350 psig), and a temperature in the range from 30° C. to 130° C., from 65° C. to 110° C., from 75° C. to 120° C., or from 80° C. to 120° C. For a number of embodiments, operating temperatures may be less than 112° C. Stirred and/or fluidized bed gas phase polymerization systems may be utilized.

Generally, a conventional gas phase fluidized bed polymerization process can be conducted by passing a stream containing one or more olefin monomers continuously through a fluidized bed reactor under reaction conditions and in the presence of a catalyst composition at a velocity sufficient to maintain a bed of solid particles in a suspended state. A stream comprising unreacted monomer can be continuously withdrawn from the reactor, compressed, cooled, optionally partially or fully condensed, and recycled back to the reactor. Product, i.e., polymer, can be withdrawn from the reactor and replacement monomer can be added to the recycle stream. Gases inert to the catalyst composition and reactants may also be present in the gas stream. The polymerization system may include a single reactor or two or more reactors in series, for example.

Feed streams for the polymerization process may include olefin monomer, non-olefinic gas such as nitrogen and/or hydrogen, and may further include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. Feeds may enter the reactor at a single or multiple and different locations.

A number of embodiments of the present disclosure provide that oxygen may be added to the polymerization at a concentration relative to an ethylene feed rate to the reactor of about 10 to 600 parts per billion volume (ppbv), and more preferably about 10 to 500 ppbv.

Organometallic compounds may be employed as scavenging agents to remove catalyst poisons, which may increase the catalyst activity, or for other purposes. Examples of organometallic compounds that may be added include metal alkyls, such as aluminum alkyls. Conventional additives may also be used in the process.

An illustrative catalyst reservoir suitable for continuously feeding dry catalyst powder into the reactor is shown and described in U.S. Pat. No. 3,779,712, for example. A gas that is inert to the catalyst, such as nitrogen or argon, can be used to carry the catalyst into the reactor bed. In another embodiment, the catalyst can be provided as a slurry in mineral oil or liquid hydrocarbon or mixture such, as for example, propane, butane, isopentane, hexane, heptane or octane. An illustrative catalyst reservoir is shown and described in WO 2004/094489. The catalyst slurry may be delivered to the reactor with a carrier fluid, such as, for example, nitrogen or argon or a liquid such as for example isopentane or other $C_3$ to $C_8$ alkanes.

The FIGURE illustrates an example of a portion of a polymerization system 150 in accordance with one or more embodiments of the present disclosure. The polymerization system 150 may be utilized for polymerization process, as described herein. The polymerization system 150 can include a reactor 160 in fluid communication with one or more discharge tanks 175 (only one shown), surge tanks 180 (only one shown), and recycle compressors 190 (only one shown). The polymerization system 150 can also include more than one reactor 160, e.g., arranged in series, parallel, or configured independently from the other reactors. Each reactor may have its own associated tanks 175, 180 and compressors 190 or alternatively, may share any one or more of the associated tanks 175, 180 and compressors 190. For simplicity and ease of description, the polymerization system 150 will be further described in the context of a single reactor train.

The reactor 160 can include a reaction zone 162 in fluid communication with a velocity reduction zone 164. The reaction zone 162 can include a bed of growing polymer particles, formed polymer particles, and catalyst particles fluidized by the continuous flow of polymerizable and modifying gaseous components in the form of make-up feed and recycle fluid through the reaction zone 162.

A feedstream 105 can be directed to enter the cycle line before the compressor 190, but may also be located at any point in the polymerization system 150, including to the reactor fluid bed, the expanded section or to the cycle line before or after the cooler, e.g., as illustrated with alternative feedstream location 147. The term "feed stream" as used herein refers to a raw material, either gas phase or liquid phase, used in a polymerization process to produce a polymer. For example, a feed stream may comprise a monomer as discussed herein. For instance, a feedstream may comprise an olefin monomer including substituted and unsubstituted alkenes having two to 12 carbon atoms, such as ethylene, propylene, 1-butene, 1-pentene, 4-methyl-1-pentene, 1-hexene, 1-octene, 1-decene, 1-dodecene, styrene, derivatives thereof, and combinations thereof. The feed stream may also include a non-olefinic gas such as nitrogen and hydrogen. Feed streams may enter the reactor at multiple and different locations. For example, monomers can be introduced into the polymerization zone in various ways including direct injection through a nozzle (not illustrated) into the bed. A feed stream may further include one or more non-reactive alkanes, e.g., that may be condensable in the polymerization process, for removing the heat of reaction. Non-reactive alkanes include, but are not limited to, propane, butane, isobutane, pentane, isopentane, hexane, isomers thereof, derivatives thereof, and combinations thereof.

For a polymerization process utilizing a chromium-based catalyst, including those modified with aluminum alkyls, hydrogen may be added at a gas mole ratio of hydrogen to ethylene in the reactor that can be in a range of about 0.0 to 0.5, in a range of 0.01 to 0.4, in a range of 0.03 to 0.3, or in a range of 0.005 to 0.020. A number of embodiments of the present disclosure utilize hydrogen gas. The hydrogen can affect the molecular weight and/or distribution of the polymer and may influence polymer properties.

During polymerization, the fluidized bed can have a general appearance of a dense mass of individually moving particles as created by the percolation of gas through the bed. A pressure drop through the bed can be equal to or slightly greater than a weight of the bed divided by a cross-sectional area. In other words, it can be dependent on the geometry of the reactor 160. To maintain a viable fluidized bed in the reaction zone 162, a superficial gas velocity through the bed can exceed a minimum flow velocity for fluidization. The superficial gas velocity can be at least two times the minimum flow velocity. For a number of embodiments, the superficial gas velocity does not exceed 5.0 ft/sec (1.52 m/sec). For a number of embodiments, the superficial gas velocity will be no more than 2.5 ft/sec (0.76 m/sec).

A height to diameter ratio of the reaction zone 162 can be in the range of from about 2:1 to about 5:1. The range may vary to larger or smaller ratios, e.g., depending upon a desired production capacity. A cross-sectional area of the velocity reduction zone 164 can be within the range of about 2 to about 3 multiplied by the cross-sectional area of the reaction zone 162, for example.

The velocity reduction zone 164 has a larger inner diameter than the reaction zone 162. As the name suggests, the velocity reduction zone 164 slows the velocity of the gas due to the increased cross sectional area. This reduction in gas velocity drops the entrained particles into the bed, allowing primarily only gas to flow from the reactor 160. That gas exiting the overhead of the reactor 160 is a recycle gas stream 149.

The recycle stream 149 can be compressed in a compressor 190 and then passed through a heat exchange zone where heat is removed before it is returned to the bed. The heat exchange zone can be a heat exchanger 192, which can be of the horizontal or vertical type, for example. Several heat exchangers can be employed to lower the temperature of the cycle gas stream in stages. It is also possible to locate the compressor downstream from the heat exchanger or at an intermediate point between several heat exchangers. After cooling, the recycle stream can be returned to the reactor 160. The cooled recycle stream can absorb the heat of reaction generated by the polymerization reaction.

The recycle stream can be returned to the reactor 160 and to the fluidized bed through a gas distributor plate 195. A gas deflector 196 can be installed at the inlet to the reactor 160, e.g., to reduce contained polymer particles from settling out and agglomerating into a solid mass and/or to reduce liquid accumulation at the bottom of the reactor, as well to facilitate easy transitions between processes which contain liquid in the cycle gas stream and those which do not and vice versa. An illustrative deflector suitable for this purpose is described in U.S. Pat. Nos. 4,933,149 and 6,627,713, for instance.

An activated precursor composition, with or without an aluminum alkyl modifier, which collectively can be referred to as catalyst, can be stored for service in a catalyst reservoir 155 under a blanket of a gas which is inert to the stored material, such as nitrogen or argon. The catalyst reservoir 155 can be equipped with a feeder suitable to continuously feed the catalyst into the reactor 160. An illustrative catalyst reservoir is shown and described in U.S. Pat. No. 3,779,712, for example. A gas that is inert to the catalyst, such as nitrogen or argon, can be used to carry the catalyst into the bed. The carrier gas can be the same as the blanket gas used for storing the catalysts in the catalyst reservoir 155. In one embodiment, the catalyst is a dry powder and the catalyst feeder comprises a rotating metering disk. In another embodiment, the catalyst is provided as a slurry in mineral oil or liquid hydrocarbon or mixture such as for example propane, butane, isopentane, hexane, heptane or octane. An illustrative catalyst reservoir is shown and described in WO 2004094489. The catalyst slurry may be delivered to the reactor with a carrier fluid, such as, for example, nitrogen or argon or a liquid such as for example isopentane or other $C_3$ to $C_8$ alkane.

The catalyst can be injected at a point into the bed where good mixing with polymer particles occurs, for example. For instance, the catalyst can be injected into the bed at a point above the distributor plate 195. Injecting the catalyst at a point above the distribution plate 195 can provide satisfactory operation of a fluidized-bed polymerization reactor, e.g., reactor 160. Injection of the catalyst into the area below the distributor plate 195 may cause polymerization to begin there and eventually cause plugging of the distributor plate 195. Injection directly into the fluidized bed can aid in distributing the catalyst uniformly throughout the bed and may help reduce the formation of localized spots of high catalyst concentration which can cause "hot spots" to form. Injection of the catalyst into the reactor 160 above the bed can result in excessive catalyst carryover into the recycle line 149, where polymerization could occur leading to plugging of the line 149 and/or heat exchanger 192.

A modifier compound, e.g., an aluminum alkyl compound, non-limiting illustrative examples of which are triethyl aluminum and diethyl aluminum ethoxide, can be added to the reaction system 150 either directly into the fluidized bed or downstream of the heat exchanger 192, in which case the modifier compound is fed into the recycle system from a dispenser 156. The amount of modifier compound added to the polymerization reactor when using the chromium based catalyst can be in a range of about 0.005 to about 10 modifier compound to chromium on a molar basis, in a range of about 0.01 to 5, in a range of about 0.03 to 3, or in a range of 0.05 to 2. Utilizing the modifier compound may provide a fluidized bulk density and/or settled bulk density of the polymer that may be depressed by about 2 to 4 $lb/ft^3$. Utilizing the modifier triethyl aluminum may decrease the melt flow index, e.g., increase molecular weight. Utilizing the modifier diethyl aluminum ethoxide may increase the melt flow index, e.g., decrease the molecular weight.

The polymerization reaction can be conducted substantially in the absence of catalyst poisons such as moisture, oxygen, and acetylene. However for a number of embodiments, oxygen can be added back to the reactor 160 at very low concentrations to alter the polymer structure and its product performance characteristics. Oxygen may be added at a concentration relative to the ethylene feed rate to the reactor of about 10 to 600 ppbv, and more preferably about 10 to 500 ppbv.

A number of embodiments provide that co-monomers are polymerized with ethylene from about 0 to anywhere from 5, 10 or 20 weight percent of the co-monomer in the copolymer to achieve a desired density range of the copolymers. The amount of co-monomer can depend on the particular co-monomer(s) being utilized, the catalyst composition, the molar ratio of aluminum to chromium, catalyst preparation conditions, and/or reaction temperature. The ratio of the co-monomer to ethylene feed ratio and/or gas mole ratio may be controlled to obtain the desired resin density of copolymer product.

A gas analyzer 151 can be used to determine the composition of the recycle stream and the composition of the stream 105 and 147, and can be adjusted accordingly to maintain an essentially steady state gaseous composition within the reaction zone 162. The gas analyzer 151 can be a conventional gas analyzer that determines the recycle stream composition to maintain the ratios of feed stream components. Such equipment is commercially available from a wide variety of sources. The gas analyzer 151 may be positioned to receive gas from a sampling point located between the velocity reduction zone 164 and heat exchanger 192.

A rate of polymer production in the bed can depend on a rate of catalyst injection and a concentration of monomer(s) in the reaction zone. The production rate can be controlled by adjusting the rate of catalyst injection, for instance. Since a change in the rate of catalyst injection can change the reaction rate and thus the rate at which heat is generated in the bed, the temperature of the recycle stream entering the reactor can be adjusted to accommodate any change in the rate of heat generation. This help to provide an essentially constant temperature in the bed. Complete instrumentation of both the fluidized bed and the recycle stream cooling system is, of course, useful to detect any temperature change in the bed so as to enable either an operator or a conventional automatic control system to adjust the temperature of the recycle stream.

Under a given set of operating conditions, the fluidized bed can be maintained at essentially a constant height by withdrawing a portion of the bed as product at the rate of formation of the polymer product. Since the rate of heat generation is directly related to the rate of product formation, a measurement of the temperature rise of the fluid across the reactor, e.g., a difference between inlet fluid temperature and exit fluid temperature, is indicative of the rate of polymer formation at a constant fluid velocity if no or negligible vaporizable liquid is present in the inlet fluid, for instance.

According to a number of embodiments, on discharge of polymer product from the reactor 160, it can be preferable to separate fluid from the product and to return the fluid to the recycle line 149. There are a number of ways known to the art to accomplish this separation. In one or more embodiments, fluid and product leave the reactor 160 and enter the product discharge tanks 175 (one is illustrated) through valve 177, which may be a ball valve designed to have minimum restriction to flow when opened. Positioned above and below the product discharge tank 175 are conventional valves 178, 179. The valve 179 allows passage of product into the product surge tanks 180 (one is illustrated).

In one or more modes of operation, valve 177 is open and valves 178,179 are in a closed position. Product and fluid enter the product discharge tank 175. Valve 177 closes and the product is allowed to settle in the product discharge tank 175. Valve 178 is then opened permitting fluid to flow from the product discharge tank 175 to the reactor 162. Valve 178 is then closed and valve 179 is opened and any product in the product discharge tank 175 flows into the product surge tank 180. Valve 179 is then closed. Product is then discharged from the product surge tank 180 through valve 184. The product can be further purged to remove residual hydrocarbons and conveyed to storage or compounding. The particular timing sequence of the valves 177, 178, 179, 184 is accomplished by the use of conventional programmable controllers which are well known in the art.

Another example of a product discharge system, which may be alternatively employed, is disclosed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor 160 can be equipped with a venting system (not illustrated) to provide venting of the bed during start up and shut down. The reactor 160 does not require the use of stirring and/or wall scraping. The recycle line 149 and the elements therein, e.g., compressor 190 and heat exchanger 192, etc., can be smooth surfaced and devoid of unnecessary obstructions so as not to impede the flow of recycle fluid or entrained particles.

Various techniques for preventing fouling of the reactor and polymer agglomeration can be used. Illustrative of these techniques are the introduction of finely divided particulate matter to prevent agglomeration, as described in U.S. Pat. Nos. 4,994,534 and 5,200,477; the addition of negative charge generating chemicals to balance positive voltages or the addition of positive charge generating chemicals to neutralize negative voltage potentials as described in U.S. Pat. No. 4,803,251, for instance. Antistatic substances may also be added, either continuously or intermittently to prevent or neutralize electrostatic charge generation. Condensing mode operation such as disclosed in U.S. Pat. Nos. 4,543,399 and 4,588,790 can also be used to assist in heat removal from the fluid bed polymerization reactor.

The conditions for polymerization processes can vary depending upon the monomers, catalysts and equipment utilized. The specific conditions are known or readily derivable by those skilled in the art. For example, the temperatures may be in the range from 30° C. to 130° C., from 65° C. to 110° C., from 75° C. to 120° C., or from 80° C. to 120° C. For one or more embodiments, operating temperatures may be less than 112° C. A number of embodiments of this disclosure provide gas phase polymerization systems, at super-atmospheric pressures in the range from 0.07 to 68.9 bar (1 to 1000 psig), from 3.45 to 27.6 bar (50 to 400 psig), or from 6.89 to 24.1 bar (100 to 350 psig). Additional known details of polymerization are described in U.S. Pat. No. 6,627,713, which is incorporated by reference.

For a polymerization process, a material balance can provide that a catalyst productivity (PROD) can be determined as a quotient of a weight of the polymer produced and a weight of the catalyst utilized (weight of the polymer produced/weight of the catalyst utilized). Further, $$PROD = \frac{\text{Weight of Resin}}{\text{Weight of Catalyst}} = \frac{D_{vp}^3 \rho_p - D_{vc}^3 \rho_c}{D_{vc}^3 \rho_c}$$

where $D_{vc}$ is a catalyst volume-averaged particle size, $\rho_c$ is a catalyst granular particle density, $D_{vp}$ is a volume-averaged particle size of the polymer produced, and $\rho_p$ is a granular particle density of the polymer produced. However, it is noted that this catalyst productivity does not account for particle cracking, i.e. catalyst cracking, that occurs during the polymerization.

A dimensionless index of particle cracking, i.e., cracking index value ($I_{pc}$), can be expressed as:

$$I_{pc} = \frac{PROD - \frac{D_{vp}^3 \rho_p - D_{vc}^3 \rho_c}{D_{vc}^3 \rho_c}}{PROD}$$

where $0 < I_{pc} < 1$. $I_{pc} = 0$ can represent the hypothetical case where there is no particle cracking during the polymerization. The cracking index value represents the cracked fraction of the catalyst support particle, silica for example. A cracking index value may be determined for a polymerization process, as described herein. As polymerization processes may vary, e.g., by changing one or more process parameters, the polymerization processes may have different corresponding cracking index values.

For a number of applications, e.g., when the polymer particle size is much larger than the catalyst particle size, $I_{pc}$ can be expressed as $$I_{pc} = \frac{PROD - \frac{D_{vp}^3 \rho_p}{D_{vc}^3 \rho_c}}{PROD}$$

Volume-averaged particle sizes for both the catalyst and the resin can be determined. For particle systems with no density variation with the particle size, the "volume-averaged particle size" is the same as the "weight-averaged particle size." For the equations herein:

Ai* refers to a total "Spherical Particle Surface" of the component "i";
NA refers to a number averaged particle diameter;
Ni refers to number of particles of the component "i";
Psi refers to a particle size (i.e., equivalent spherical diameter) of the component "i";
Wi refers to a weight of the component "i";
VA refers to a volume-averaged particle diameter;
VSA refers to a volume-surface averaged particle diameter;
WA refers to weight averaged particle diameter;
Wt refers to total weight of the particle sample;
Xi refers to weight fraction of the component "i";
ρ refers to density of the particle;
where, * "Spherical particle Surface" of a particle means the surface of a spherical particle with the same volume, i.e., $\pi PSi^3/6$, and "Spherical Particle Surface" of the component "i" means the sum of "Spherical Surfaces" of all the particles in the component "i".

Number averaged particle diameter can be defined as follows:

Number Averaged Particle Diameter =

$$\frac{\text{Sum}(PSi \times \text{Number of particles with diameter of } PSi)}{\text{Total Number of particles}} = \frac{\sum Ni \times PSi}{\sum N_i}$$

For component "i", the weight of the particles of this component, Wi, can be expressed by:

$$Wi = Ni \times \rho \times \frac{\pi}{6} PSi^3$$

From which, Ni can be expressed by:

$$Ni = \frac{Wi}{\rho \times \frac{\pi}{6} PSi^3}$$

which may be inserted into the Number averaged particle diameter equation to obtain:

$$NA = \frac{\sum_i \left( \frac{Wi}{\rho \times \frac{\pi}{6} PSi^3} \times PSi \right)}{\sum_i \left( \frac{Wi}{\rho \times \frac{\pi}{6} PSi^3} \right)} =$$

$$\frac{\sum_i \left( \frac{Wi}{PSi^2} \right)}{\sum_i \left( \frac{Wi}{PSi^3} \right)} = \frac{\sum_i \left( \frac{Wi}{PSi^2} \times \frac{1}{Wt} \right)}{\sum_i \left( \frac{Wi}{PSi^3} \times \frac{1}{Wt} \right)} = \frac{\sum_i \left( \frac{Xi}{PSi^2} \right)}{\sum_i \left( \frac{Xi}{PSi^3} \right)}$$

to provide that the number-averaged particle diameter can be expressed as follows:

$$NA = \frac{\sum_i \left( \frac{Xi}{PSi^2} \right)}{\sum_i \left( \frac{Xi}{PSi^3} \right)}$$

Weight averaged particle diameter can be defined as follows:

Weight Averaged Particle Diameter =

$$\frac{\text{Sum}(PSi \times \text{Weight of particles with diameter of } PSi)}{\text{Total Weight}} = \frac{\sum Wi \times PSi}{\sum W_i}$$

$\sum Wi = Wt$ $$WA = \frac{\sum_i WiPSi}{Wt} = \sum_i XiPSi$$

to provide a weight averaged particle diameter can be expressed as follows $$WA = \sum_i XiPSi$$

Volume-surface-averaged particle diameter can be defined as follows:

Volume – Surface – AveragedParticleDiameter =

$$\frac{\text{Sum}(PSi \times \text{"}SpericalParticleSurface\text{" of}}{\text{Total "}SpericalParticleSurfaces\text{"}} = \frac{\sum Ai \times PSi}{\sum A_i}$$
$$\text{of the } ParticleSample$$

Ai can be expressed as follows:

$Ai = Ni \times \pi \times Psi^2$ which, by substitution, yields:

$$VSA = \frac{\sum_i NiPSi^3}{\sum_i NiPSi^2}$$

As such, VSA can be expressed as follows:

$$VSA = \frac{\sum_i Wi}{\sum_i \frac{Wi}{PSi}} = \frac{Wt}{\sum_i \frac{Wi}{PSi}} = \frac{1}{\sum_i \frac{Wi}{PSi}}$$

Volume averaged particle diameter can be defined as follows:

Volume Averaged Particle Diameter =

$$\frac{\text{Sum}(PSi \times \text{"Volume" of particles with diameter of } PSi)}{\text{Total "Volume" of the Particle Sample}} = \frac{\sum Vi \times PSi}{\sum V_i}$$

Vi can be expressed as follows:

$$Vi = \frac{\pi}{6} Ni \times Psi^3$$

As such, volume averaged particle diameter can be expressed as follows:

$$VA = \frac{\sum_i Ni \frac{\pi}{6} \rho PSi^3 \times PSi}{\sum_i Ni \frac{\pi}{6} \rho PSi^3} = \frac{\sum_i Wi \times PSi}{\sum_i Wi} = \frac{\sum_i Wt \times PSi}{Wt} = \sum_i Xi \times PSi$$

As mentioned, methods for rating a polymerization process based upon a cracking index value are described herein.

As polymerization processes may vary, e.g., by changing one or more process parameters, the polymerization processes may have different corresponding cracking index values. There are a number of process parameters, such as residence time, catalyst, temperatures, mole ratios of reactants, pressures, and superficial gas velocity, among other process parameters known to those of ordinary skill in the art. One or more process parameters may be changed, e.g. increased and/or decreased, to provide a different polymerization process. For instance, residence time of reactor components may be increased or decreased; a catalyst component amount, such as a catalyst chromium amount and/or a catalyst aluminum amount, may be increased or decreased; a reactor temperature may be increased or decreased; or a reactor pressure may be increased or decreased. Different increases and/or decreases may be utilized for various process parameters.

As an example, a first polymerization process may be performed and a cracking index value for the first polymerization process may be determined. Thereafter, a second polymerization process, having a process parameter changed relative to the first polymerization process, may be performed and a cracking index value for the second polymerization process may be determined. As a process parameter, i.e. one or more process parameters, is changed from the first polymerization process to the second polymerization process, the cracking index values for the first and second polymerization processes may be different. The first and second polymerization processes may then be rated based upon the cracking index values.

One or more embodiments of the present disclosure provide that the polymerization process having the greater relative cracking index value can have a higher relative rating, as compared to the relatively lower rating associated with the polymerization process having the lesser relative cracking index value. However, one or more embodiments of the present disclosure provide that the polymerization process having the greater relative cracking index value can have a lower relative rating, as compared to the relatively higher rating associated with the polymerization process having the lesser relative cracking index value.

One or more embodiments of the present disclosure provide that the polymerization processes may have a same cracking index value. Polymerization processes having the same cracking index value may also have a same rating.

The polymers described herein may be utilized to form a number of products including films and pipes, among others. For some products, e.g., some films, it may be desirable to have a reduced TDA, e.g., a reduced gel-related TDA, as compared to other films. Gels, in a fabricated film, may result from among other things high molecular weight species and/or from poorly distributed/fractured catalyst particles. Total defect area is a film quality measurement that may be obtained using an Optical Control Systems (OCS) FSA-100 Film Testing System mounted on a cast film line, e.g., ME20V4 Extruder and MFA-200 Chill Roll/Wind-up, for instance. Defects can be detected when light transmitted through the web falls below a user defined threshold. The threshold can be defined as a percentage of the background light transmitted through the web. As an example, a minimum size of detection for a defect can be 25 µm²; another example is a 50 µm² minimum size. TDA can be expressed as ppm, e.g., Sum of Defect Area, mm²/Inspected Area, M², or as mm² with a reference to the area inspected. Some instances are seen in the industry, over 0.65 m² of surface. Defects of the total defect area, particularly those greater than 200 µm², can be aesthetically displeasing, reduce a quality of printing on the polymer, and/or undesirably provide mechanically weak areas of the film.

A polymerization process may then be selected for a particular application based upon the cracking index value ratings. For instance, for a particular application a polymerization processes having a higher rating, i.e., corresponding to a relatively greater cracking index value, may be selected to form a polymer over a different polymerization processes having a relatively lower rating. For another particular application, a polymerization processes having a lower rating, i.e., corresponding to a relatively lesser cracking index value, may be selected to form a polymer over a different polymerization processes having a relatively greater rating. For polymerization processes having equal cracking index value ratings, additional considerations such as residence time and/or TDA, for instance, may be utilized in selecting a polymerization for a particular application.

Additionally, rating a number of polymerization process based upon their corresponding cracking index values may advantageously provide a metric for changing a process parameter. For example, a first polymerization processes having a first residence time of reactor components may have a first cracking index value; a second polymerization processes having a second residence time of reactor components, which is greater than the first residence time, may have a second cracking index value; and a third polymerization processes having a third residence time of reactor components, which is greater than the second residence time, may have a third cracking index value. A greater second cracking index value, as compared to the first cracking index value, can indicate a desirable result, such as a reduced TDA for instance, from changing the process parameter. Similarly, a greater third cracking index value, as compared to the second cracking index value, can indicate another desirable result from changing the process parameter. However, a lesser third cracking index value, as compared to the second cracking index value, can indicate an undesirable result from changing the process parameter. As the undesirable result, i.e., the relatively reduced cracking index value, has been determined, the process parameter, here being residence time of reactor components, can be considered to have a cracking index value maximum between the first and third residence times. Identifying this maximum can help provide selecting a desirable polymerization process and/or provide reference points that may be utilized for additional process parameter changes to help more precisely locate the maximum.

EXAMPLES

Catalyst A (ACCLAIM™ K-110 Catalyst I; chromium oxide based catalyst reduced with an aluminum ethoxide compound in a slurry mix tank having a first batch size and a first drying temperature; available from the Dow Chemical Company) and Catalyst B (ACCLAIM™ K-110 Catalyst III;

chromium oxide based catalyst reduced with an aluminum ethoxide compound in a slurry mix tank having a second batch size that is less than the first batch size, and a second drying temperature, which is greater than the first drying temperature; available from the Dow Chemical Company) were utilized.

Polymers 1-6 were formed respectively from Polymerization Processes 1-6. Polymerization Processes 1-6 were gas-phase polymerization processes performed with a UNIPOL™ pilot plant gas phase fluid bed reactor. The reactor comprised a vertical cylinder with a nominal pipe size of approximately 14 inches, followed by a freeboard, diameter transition spool piece and an expanded section. In operation, fluidizing gas was circulated in a continuous loop entering the fluidized bed from below through a distributor plate, passing through the bed and out the top of the reactor to a cycle gas compressor (blower) and then through a shell and tube cooler to control the bed polymerization temperature. Superficial gas velocity was calculated continuously through the bed and maintained with a ball valve and venturi assembly in the cycle line. Concentration of monomers and reactive/non-reactive gases was monitored by a chromatograph that sampled the gas every 1 to 5 minutes. Ethylene partial pressure was measured and controlled by a DCS (Distributed Control System), as were the hydrogen and any comonomer levels that were converted to gas mole ratio to ethylene partial pressure for controlling the polymer flow index and the polymer density. Total reactor pressure was essentially constant and controlled with make-up nitrogen or by additional venting. Polymer was discharged periodically from the reactor through a first valve to a receiving tank where it was purged with nitrogen, and then through a second valve to a mobile receiving vessel.

Polymerization Processes 1-6 utilized the process parameters reported in Table 1. Process parameters, e.g., catalyst type and/or residence time, were varied when forming Polymers 1-6. Polymer 1 was formed by a polymerization process utilizing Catalyst A and a residence time of 1.5 hours; Polymer 2 was formed by a polymerization process utilizing Catalyst A and a residence time of 2.1 hours; Polymer 3 was formed by a polymerization process utilizing Catalyst A and a residence time of 2.5 hours; Polymer 4 was formed by a polymerization process utilizing Catalyst B and a residence time of 2.5 hours; Polymer 5 was formed by a polymerization process utilizing Catalyst B and a residence time of 2.1 hours; and Polymer 6 was formed by a polymerization process utilizing Catalyst B and a residence time of 1.5 hours.

TABLE 1

| | Units | Polymerization Process 1 | Polymerization Process 2 | Polymerization Process 3 | Polymerization Process 4 | Polymerization Process 5 | Polymerization Process 6 |
| --- | --- | --- | --- | --- | --- | --- | --- |
| Catalyst Type | — | Catalyst A | Catalyst A | Catalyst A | Catalyst B | Catalyst B | Catalyst B |
| Reactor bed temperature | °C. | 105.0 | 105.0 | 105.0 | 105.0 | 105.0 | 105.0 |
| Inlet gas temperature | °C. | 86 | 93 | 95 | 94 | 92 | 86 |
| Reactor pressure | psig | 348 | 350 | 348 | 348 | 348 | 348 |
| $C_2H_4$ partial pressure | psia | 200 | 200 | 200 | 200 | 200 | 198 |
| $H_2/C_2H_4$ Molar ratio | — | 0.110 | 0.110 | 0.110 | 0.110 | 0.112 | 0.086 |
| $C_6H_{12}/C_2H_4$ Molar ratio | — | 0.0026 | 0.0028 | 0.0028 | 0.0029 | 0.0027 | 0.0027 |
| $O_2/C_2H_4$ ratio | ppbv | 41.0 | 69.3 | 68.0 | 46.1 | 40.0 | 20.0 |
| Isopentane concentration | Mole % | 0.001 | 0.014 | 0.001 | 0.003 | 0.002 | 0.003 |
| Superficial gas velocity | Ft/sec | 1.82 | 1.85 | 1.85 | 1.86 | 1.86 | 1.86 |
| Production rate | Lb/hr | 69.4 | 48.0 | 40.0 | 41.3 | 50.1 | 68.2 |
| Fluidized bulk density | Lb/ft³ | 13.9 | 12.3 | 12.2 | 14.0 | 14.3 | 15.0 |
| Residence time | hr | 1.5 | 2.1 | 2.5 | 2.5 | 2.1 | 1.5 |

Cracking index values were determined for Polymers 1-6. The cracking index values are reported in Table 2.

Films 1-6 were formed respectively from Polymers 1-6 as follows. Films 1-6 were formed with a cast film line ME20V4 Extruder and MFA-200 Chill Roll/Wind-up. Heater zone temperatures were 25° C. in the throat, and 185° C. to progressively 230° C. from Zone 1 to Zone 5, with a melt temperature of approximately 234° C. The screw speed was 37.5 rpm with a pressure of approximately 164 bar to 170 bar. The torque was approximately 37 Nm to 43 Nm. An air knife was employed with an air flow of 9.1 L/h, a distance position of 12.4, a height position of 1.75 and an angle of 4. Winder settings were the following: 45° C. chill roll temperature, 3.2 m/min chill roll speed, 7.0 N film tension, and 5.0 N winder tension. Output settings were approximately 15.4 g/min or approximately 0.41 g/min/rpm.

Total defect area for Films 1-6 was determined utilizing an Optical Control Systems (OCS) FSA-100 Film Testing System mounted on the cast film line ME20V4 Extruder and MFA-200 Chill Roll/Wind-up. The OCS software settings were as follows: the film thickness was 1.5 mil, the film width was 135 mm, the grey value was 169 to 170, the level 0 threshold was 55, the parcel area was 4247 mm$^2$, the number of parcels inspected was 707, the inspected area was 3 M$^2$, mean filter size was 25, the X resolution was 25 µm and the Y resolution was 25 µm. The TDA values are reported in Table 2.

TABLE 2

|  | Catalyst | Residence Time (hr) | Cracking Index Value | Total Defect Area (mm$^2$/0.652 m$^2$) |
|---|---|---|---|---|
| Polymer 1/Film 1 | A | 1.5 | 15% | 16.46 |
| Polymer 2/Film 2 | A | 2.1 | 41% | 11.26 |
| Polymer 3/Film 3 | A | 2.5 | 41% | 13.38 |
| Polymer 4/Film 4 | B | 2.5 | 68% | 7.55 |
| Polymer 5/Film 5 | B | 2.1 | 68% | 8.62 |
| Polymer 6/Film 6 | B | 1.5 | 47% | 8.23 |

Polymerization processes were rated based upon the corresponding cracking index values for Polymers 1-6.

Example 1: Polymer 2 (Catalyst A; 2.1-hour residence time) was rated higher than Polymer 1 (Catalyst A; 1.5-hour residence time).

Example 2: Polymer 2 (Catalyst A; 2.1-hour residence time) was rated equal to Polymer 3 (Catalyst A; 2.5-hour residence time).

Example 3: Polymer 3 (Catalyst A; 2.5-hour residence time) was rated higher than Polymer 1 (Catalyst A; 1.5-hour residence time).

Example 4: Polymer 5 (Catalyst B; 2.1-hour residence time) was rated equal to Polymer 4 (Catalyst B; 2.5-hour residence time).

Example 5: Polymer 5 (Catalyst B; 2.1-hour residence time) was rated higher than Polymer 6 (Catalyst B; 1.5-hour residence time).

Example 6: Polymer 4 (Catalyst B; 2.5-hour residence time) was rated higher than Polymer 6 (Catalyst B; 1.5-hour residence time).

Example 7: Polymer 6 (Catalyst B; 1.5-hour residence time) was rated higher than Polymer 1 (Catalyst A; 1.5-hour residence time).

Example 8: Polymer 5 (Catalyst B; 2.1-hour residence time) was rated higher than Polymer 2 (Catalyst A; 2.1-hour residence time).

Example 9: Polymer 4 (Catalyst B; 2.5-hour residence time) was rated higher than Polymer 3 (Catalyst A; 2.5-hour residence time).

The data of Table 2 illustrates that Polymer 2 had an increased Cracking Index Value as compared to Polymer 1 and Film 2 had a reduced TDA as compared to Film 1. The data of Table 2 illustrates that Polymer 3 had an increased Cracking Index Value as compared to Polymer 1 and Film 3 had a reduced TDA as compared to Film 1. This indicates that when utilizing Catalyst A and varying residence times for the polymerization processes, films formed from polymerization processes having relatively higher ratings had relatively reduced TDA. It was observed that Polymer 2 had an equal Cracking Index Value as compared to Polymer 3 and Film 2 had a reduced TDA as compared to Film 3. While not being bound to theory, this may indicate that when utilizing a particular catalyst, e.g., Catalyst A, a threshold Cracking Index Value, e.g. 41%, may be reached such that a correlation between a relatively increasing Cracking Index Value and a relatively reducing TDA is diminished.

The data of Table 2 illustrates that Polymer 4 had an increased Cracking Index Value as compared to Polymer 6 and Film 4 had a reduced TDA as compared to Film 6. This indicates that when utilizing Catalyst B and varying residence times for the polymerization processes, films formed from polymerization processes having relatively higher ratings had relatively decreased TDA. It was observed that Polymer 6 had a decreased Cracking Index as compared to Polymer 5 and Film 6 had a reduced TDA as compared to Film 5. While not being bound to theory, this may indicate that when utilizing a particular catalyst, e.g., Catalyst B, a threshold residence time, e.g. 2.1 hours, may be reached such that beyond that residence time a correlation between a relatively increasing Cracking Index Value and a relatively reducing TDA is observed.

The data of Table 2 illustrates that Polymer 6 had an increased Cracking Index Value as compared to Polymer 1 and Film 6 had a reduced TDA as compared to Film 1; Polymer 5 had an increased Cracking Index Value as compared to Polymer 2 and Film 5 had a reduced TDA as compared to Film 2; Polymer 4 had an increased Cracking Index Value as compared to Polymer 3 and Film 4 had a reduced TDA as compared to Film 3. This indicates that when utilizing a same residence time and varying catalysts for the polymerization processes, films formed from polymerization processes having relatively higher ratings had relatively decreased TDA.

What is claimed:

1. A method for rating a polymerization process, comprising:
   determining a first cracking index value for a first polymerization process;
   changing one or more parameters of the first polymerization process to provide a second polymerization process;
   determining a second cracking index value for the second polymerization process; and
   rating the first polymerization process and the second polymerization process based upon the first cracking index value and the second cracking index value, wherein the cracking index values for the polymerization processes are respectively expressed as $$I_{pc} = \frac{\frac{\text{weight of polymer produced}}{\text{weight of catalyst utilzed}} - \frac{D_{vp}^3 \rho_p - D_{vc}^3 \rho_c}{D_{vc}^3 \rho_c}}{\frac{\text{weight of polymer produced}}{\text{weight of catalyst utilzed}}}$$

where $I_{pc}$ is the cracking index value, $D_{vc}$ is a catalyst volume-averaged particle size, $\rho_c$ is a catalyst granular particle density, $D_{vp}$ is a volume-averaged particle size of polymer produced, and $\rho_p$ is a granular particle density of polymer produced.

2. The method of claim 1, wherein the first cracking index value is greater than the second cracking index value.

3. The method of claim 2, wherein the first polymerization process is rated higher than the second polymerization process.

4. The method of claim 2, wherein the second polymerization process is rated higher than the first polymerization process.

5. The method of claim 1, wherein the one or more changed parameters of the first polymerization process is a catalyst.

6. The method of claim 1, wherein the one or more changed parameters of the first polymerization process is a residence time.

7. The method of claim 6, wherein the residence time is increased from the first polymerization process to the second polymerization process.

8. The method of claim 6, wherein the residence time is decreased from the first polymerization process to the second polymerization process.

* * * * *